June 23, 1959   LE ROY N. HAVERLY ET AL   2,891,806
TRAILER HITCH
Filed Jan. 17, 1956
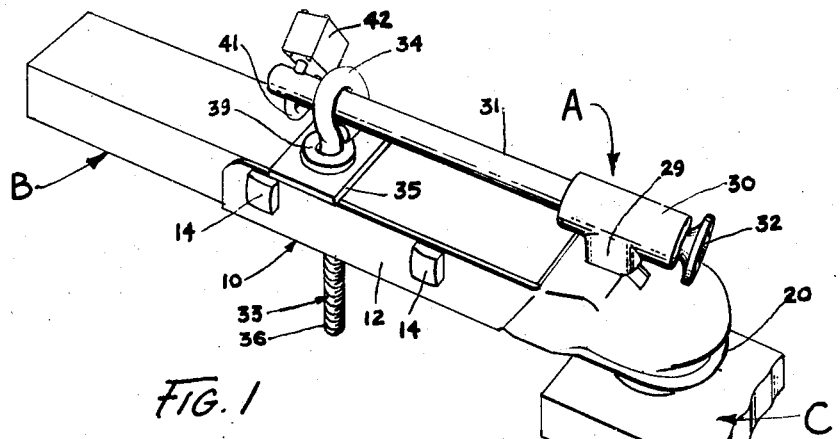
FIG. 1
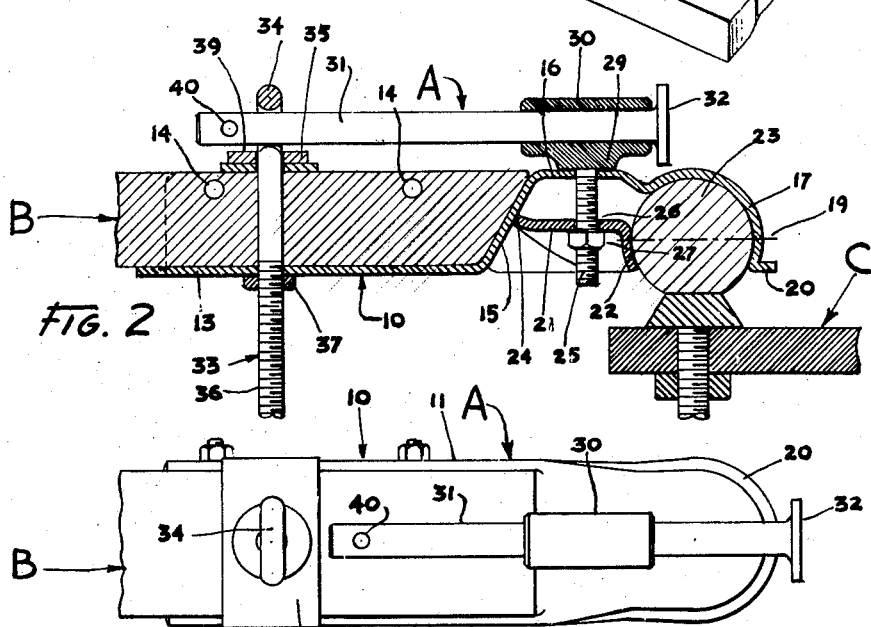
FIG. 2
FIG. 3
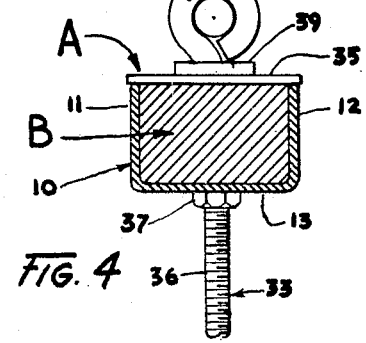
FIG. 4
INVENTOR
Le Roy N. Haverly
Lawrence E. Mortenson
BY Robert M. Dunning
ATTORNEY

United States Patent Office 2,891,806
Patented June 23, 1959

2,891,806

TRAILER HITCH

Le Roy N. Haverly, St. Paul, and Lawrence E. Mortenson, West St. Paul, Minn.

Application January 17, 1956, Serial No. 559,580

2 Claims. (Cl. 280—511)

This invention relates to an improvement in trailer hitches and deals with a type of hitch which securely and safely connects a trailer to an automobile or other towing vehicle.

Many types of trailer hitches have been produced. Many of these hitches include a channel shaped member which is detachably secured to the tongue of the trailer and which is provided at its forward end with a downwardly opening socket. This socket is designed to accommodate a ball which is attached to the rear end of the towing vehicle in any suitable manner. The forward part of the socket encircles the upper portion of the ball and extends below the center thereof. A clamping plate is provided which engages against the rear side of the ball and extends to a point below the center of the ball. A clamping bolt extends through the trailer hitch rearwardly of the socket and extends through the clamping plate. By operation of this clamping bolt, the ball may be securely clamped between the clamping plate and the socket of the trailer hitch, thus forming a universal connection which will permit the trailer to pivot relative to the towing vehicle and which will also permit the trailer to move out of the plane of the towing vehicle.

While such hitches have been produced in a very considerable volume, they are possessed of certain very definite difficulties. One of the greatest difficulties lies in the fact that the clamping bolt often loosens due to vibration as the trailer is drawn along the highway.

In the event the clamping bolt loosens sufficiently, the clamping plate no longer holds the ball in its socket permitting the trailer to be released. In the event the towing vehicle is travelling at a high rate of speed, the sudden release of the connection will cause the trailer to move along the highway at a considerable speed entirely out of control. As a result, many serious accidents have been caused and material damage has resulted to other vehicles as well as to the trailer itself.

Attempts have been made to employ ratchet devices which are designed to hold the clamping bolt from rotation once it has been tightened. However, these ratchets are clumsy and awkward to operate and must be manually disengaged in the event the trailer is to be disconnected. Furthermore, if such ratchet devices are to be easily operated, the spring urging the ratchet into place must be a relatively light spring which can be easily damaged and which is often not particularly resistant to the effects of the weather. Trailer hitches often become coated with dirt, snow and ice and must be sturdy and simple in form in order to stand up under long periods of use. Furthermore, such ratchet types of devices are not particularly well suited to accommodate any positive lock such as a padlock and accordingly require further complication in the event it is desired to provide a means of locking the trailer to the towing vehicle.

A feature of the present invention resides in the provision of a clamping bolt which is equipped with a barrel or sleeve which is positioned to extend in a plane substantially parallel to the longitudinal axis of the trailer hitch. This barrel is designed to slideably accommodate an elongated pin. An eye-bolt or similar member is provided on the hitch and designed to accommodate an end of the elongated pin in one rotative position of the locking bolt. Accordingly, when the locking bolt is tightened, it is turned until the barrel or sleeve is axially aligned with the opening through the eye-bolt. The pin may then be moved in the barrel so as to slide through the eye-bolt, thus positively locking the clamping bolt from rotation.

A feature of the present invention lies in the fact that the locking pin may be inserted through the barrel or sleeve in either direction. Accordingly the operator may select the proper position for the clamping bolt with either end of the sleeve directed toward the eye-bolt.

An important feature of the present invention resides in the provision of a trailer hitch which requires no tools to operate once it has been mounted on the tongue of the trailer. In view of the fact that the eye-bolt is normally located at a substantial distance from the clamping bolt, the locking pin may be of considerable length. By sliding the pin to a position where both ends of the pin will clear the eye-bolt, the pin may be used as a lever arm to tighten the clamping bolt more securely than would otherwise be possible without the use of a wrench or other tool.

A further feature of the present invention resides in the provision of a trailer hitch having a clamping bolt provided with a socketed end and in slideably supporting a headed pin in this socketed end. The head of the pin limits the movement of the pin through the socket in one direction. The other end of the pin is designed to extend through the eye-bolt aperture. A pad-lock or other suitable locking means extends through an aperture in the unheated end of the pin to prevent withdrawal of the locking pin when it is in place. When the lock is in place, the trailer cannot be removed from the towing vehicle and the trailer could not be stolen without cutting the tongue of the trailer, cutting some portion of the hitch itself, or breaking the padlock.

These and other objects and novel features of the invention will be more clearly and fully set forth in the following specification and claims.

In the drawings forming a part of the specification:

Figure 1 is a perspective view showing a trailer tongue connected to the drawbar of a towing vehicle, the hitch being locked in attached position.

Figure 2 is a longitudinal section through the trailer tongue, the drawbar, and the hitch showing the arrangement of parts thereof.

Figure 3 is a top plan view of the hitch with the locking pin withdrawn from the eye-bolt so that the clamping bolt may be operated.

Figure 4 is an end view of the trailer hitch, showing the trailer tongue end section.

The trailer hitch is indicated in general by the letter A and is designed to connect a trailer tongue B normally connected to the front of the trailer to a drawbar or other such element C normally attached to the rear of the towing vehicle. As the detail of construction of the trailer tongue and of the drawbar are not important in the present invention, they are merely shown diagrammatically.

The trailer hitch A includes an elongated channel shaped body 10 having parallel sides 11 and 12 and a connecting base 13. The channel shaped member is of proper size to accommodate the forward end of the trailer tongue B. Attaching bolts such as 14 extend through the spaced sides 11 and 12 and through the trailer tongue B to attach these parts together.

At the forward end of the channel shaped member 10 the base member 13 inclines upwardly as is indicated at 14 and this base member then extends forwardly along the upper edges of the side walls as indicated at 16 terminating in a rounded socket 17. The lower edge of the socket 17 extends somewhat below the center line 19 of the inner surface of the socket and a reinforcing rim 20 is provided along the lower edge of the socket. The side walls 11 and 12 of the channel shaped member extend to form the sides of the socket and the side walls are spaced apart just far enough to accommodate the ball connector therebetween.

A clamping plate 21 is provided having a forward end 22 which is shaped to fit about the surface of a ball connector 23, the lower edge of the clamping plate surface 22 extending beneath the center line 19 of this ball connector 23. The clamping plate 21 extends generally parallel to the substantially flat portion 16 of the hitch and has an extremity 24 which abuts against the inclined wall 15 in substantial surface contact therewith. As this clamping plate 21 is tightened against the spherical surface of the ball 23, this ball is urged into the socket 17 and the ball is held from disengagement. When the clamping plate 21 is loosened, the ball 23 may slip out between the arcuate end 22 of the clamping plate and the lower edge of the socket 17.

A clamping bolt 25 extends through the upper hitch surface 16 and through a suitable aperture 26 in the clamping plate 21, extending through a locking nut 27 located beneath the clamping plate 21. Preferably, the clamping nut 27 is too close to the arcuate portion 22 of the clamping plate to rotate when the clamping bolt 25 is rotated. Alternatively, the clamping nut 27 may be actually attached to the clamping plate 21, although it is somewhat preferable that the two parts be separate.

The clamping bolt 25 is provided with an enlarged head 29 which bears against the upper surface of the hitch portion 16. This head 29 is provided at its upper extremity with a barrel or sleeve 30 which has its axis on a plane substantially parallel to the plane of the base 13 of the channel member 10. The sleeve or barrel 30 is designed to slideably accommodate a locking pin or arm 31 having an enlarged head 32 at one end thereof.

An eye-bolt 33 having an apertured head 34 extends through a reinforcing plate 35 bridging the opposite sides 11 and 12 of the channel-shaped member at the upper edges of the sides. The eye-bolt 33 also extends through the trailer tongue and through the base portion 13 of the channel member 10. The shank 36 of the eye-bolt 33 is threaded and is designed to accommodate a nut 37.

Spaced sleeves may be employed to fill the space between the reinforcing plate 35 and the head 34 of the eye-bolt 33. Such a spacer sleeve is indicated at 39. This sleeve 39 merely encircles the upper end of the eye-bolt shank 36 between the reinforcing member and the head of the eye-bolt to hold the head of the eye-bolt in axial alignment with the sleeve 30 when this sleeve is in the proper rotative direction. Different makes of trailer hitches are somewhat differently constructed and in some instances the heads 29 of the clamping bolt 25 are longer than in other cases. Where the present device is purchased as an accessory, the shank of the eye-bolt is purposely left long and a spacing sleeve 39 is provided which may be cut to the proper length or may match with a special clamping bolt structure of a corresponding height. After the hitch has been attached, the shank 36 of the eye-bolt is preferably cut off at the desired point. Obviously, where the hitch is produced complete by a manufacturer, the length of the eye-bolt shank may be designed accordingly.

An aperture 40 is provided in the end of the locking pin or arm 31 opposite the head 32. This aperture 40 is designed to accommodate the loop 41 of a padlock 42. Thus in the assembled form of the trailer, the locking pin 31 is held in place by a padlock thus preventing the theft of the trailer.

In the operation of the trailer hitch, the locking pin or arm 31 is partially removed, or is withdrawn from the eye-bolt 33 as indicated in Figure 3 of the drawings. The pin 31 may now be rotated about the axis of the clamping bolt 25 to loosen the clamping plate 21. When the clamping plate 21 is sufficiently loose, the trailer hitch may be placed over the ball connector 23 and this ball may be inserted into the socket 17 forwardly of the arcuate end 22 of the clamping plate 21.

The pin or arm 31 is next rotated in a reverse direction to clamp the arcuate end 22 of the clamping plate 21 against the surface of the ball 23. As the clamping bolt 25 is tightened, the pin 31 is drawn into a position in which the pin is aligned with the apertured head 34 of the eye-bolt 33. The pin 31 is then moved longitudinally until the head 32 engages against the end of the barrel 30 and the padlock 42 is attached to the pin by extending the padlock loop 41 through the aperture 40.

It will be seen that the padlock 42 not only keeps the trailer from being disconnected from the towing vehicle, but also it acts through the pin 31 to hold the clamping bolt 25 from loosening. As a result, the locking bolt cannot be accidentally loosened due to the effects of vibration as the trailer is drawn over the highway.

In accordance with the patent statutes, we have described the principles of construction and operation of our trailer hitch, and while we have endeavored to set forth the best embodiment thereof, we desire to have it understood that obvious changes may be made within the scope of the following claims without departing from the spirit of our invention.

We claim:

1. A trailer hitch including an elongated body designed for attachment to the tongue of a trailer, said body including an elongated enclosure having an open under surface at the forward end thereof, the forward end of said elongated enclosure forming a socket having an arcuate inner surface, a clamping plate in said enclosure engageable against the surface of said enclosure and having an arcuate forward end, a ball connector detachably engageable in said socket against the arcuate inner surface thereof, the arcuate end of said clamping plate being engageable against the surface of said ball connector, a clamping bolt extending through the upper surface of said hollow enclosure and through said clamping plate, rotation of said clamping bolt in one direction acting to draw said clamping plate against the surface of said ball connector, said clamping bolt having a head projecting upwardly above said hollow enclosure, an arm slideably supported by said head and movable in a direction generally parallel to the longitudinal axis of said elongated trailer hitch body in one rotative position of said clamping bolt, and means on said elongated body detachably engageable with said arm at a point on the arm substantially spaced from the head of the clamping bolt for holding said clamping bolt from rotation, said means engageable with said arm comprising an eye-bolt through which said arm may extend.

2. A trailer hitch including an elongated trailer hitch body having at its forward end an open bottom enclosure, the forward end of said enclosure being rounded to accommodate a connecting ball, a connecting ball, a clamping plate within said enclosure and including an end engageable against said connecting ball for holding the same engaged against the arcuate inner surfaces of the forward end of said enclosure, a clamping bolt extending through said clamping plate and through the top of said enclosure, rotation of said clamping bolt in one direction acting to draw said clamping plate against the surface of said connecting ball, an elongated arm slideably supported by said clamping bolt above the top of said enclosure, said arm rotating in a generally horizontal plane and extending substantially parallel to said elongated body in one rotative position of said clamping bolt, an eye-bolt on said elongated body at a point substantially spaced from said clamping bolt engageable on opposite horizontal surface portions of said arm when said arm is moved longitudinally, means on said arm limiting movement of said arm in one direction, and means detachably engageable with the other end of said arm for limiting slideable movement of said arm in the opposite direction to hold said arm engaged with said means engageable on opposite sides of said arm.

References Cited in the file of this patent

UNITED STATES PATENTS

| | | |
|---|---|---|
| 2,204,882 | Berluti | June 18, 1940 |
| 2,326,466 | Kitterman | Aug. 10, 1943 |
| 2,392,063 | Reimann | Jan. 1, 1946 |
| 2,521,132 | Smith | Sept. 5, 1950 |
| 2,558,906 | Leon | July 3, 1951 |
| 2,683,049 | Van Der Spek | July 6, 1954 |

FOREIGN PATENTS

| | | |
|---|---|---|
| 858,671 | France | May 13, 1940 |